2,970,965
Patented Feb. 7, 1961

2,970,965
PRINTING INKS AND VEHICLES THEREFOR

Joseph L. Switzer, Gates Mills, Ohio, assignor to Switzer Brothers, Inc., Cleveland, Ohio, a corporation of Ohio No Drawing. Filed Dec. 14, 1955, Ser. No. 552,988

9 Claims. (Cl. 252—301.2)

This invention relates to printing inks and particularly to printing inks for use on conventional letter presses in which rotating rollers pick up the ink and transfer it onto metallic impression plates, from which the ink is then transferred to the paper or other surface to be printed. Though of especial value for producing improved printing inks containing fluorescent pigments and dyes, with or without other pigments and dyes, the invention is also of value for producing inks containing ordinary color pigments and/or dyes for imparting any desired color to the ink, including blacks and grays.

A principal object of the invention is to provide printing inks of the character described having generally improved working qualities in the various respects hereinafter mentioned, good color retention and pigment tolerance characteristics, and good adhesion to various kinds of surfaces to be printed after application of the inks thereto.

Another principal object of the invention is to provide fluorescent printing inks which have increased brightness and color depth, both as to fluorescent and reflected emission, while retaining the other improved characteristics recited above.

The foregoing objectives are accomplished in accordance with the invention by employing, as the ink vehicle, a particular class of thermoplastic, solvent-soluble resins dissolved in a relatively high boiling point solvent. In the case of fluorescent inks, I prefer to disperse a fluorescent dye in a solvated condition in such vehicle resin before dissolving the resin in the solvent, and then to incorporate additional fluorescent dye into the vehicle in a solvated condition in a particular type of pigment resin.

The particular vehicle resins utilized, as stated above, are thermoplastic and solvent-soluble and consist of a thermoplastic, aromatic monosulfonamide-formaldehyde resin substantially completely co-condensed with a thermosetting type of amide-formaldehyde resin to increase the molecular weight above that obtainable in a plain aromatic sulfonamide-formaldehyde resin, while retaining the necessary solubility.

The thermosetting amide-formaldehyde resin used to modify the thermoplastic, aromatic sulfonamide resin is one resulting from the condensation of formaldehyde with an amide having at least two functional amide groups, of which at least one is $NH_2$, such as melamine, urea, dicyandiamide, and their derivatives, for example. The co-condensation should be substantially complete, in the sense that there is no further condensation on further heating, in order to obtain a co-condensation product of maximum molecular weight while retaining stability and solubility of the product and avoiding gelling during hot-mixing into the solvent and during shelf-storage of the product.

Depending upon the particular polyfunctional amide used in making the thermosetting amide-formaldehyde resin, the maximum amount of this resin in the co-condensation product may run as high as 50% by weight of the co-condensation product, or more, while still obtaining a thermoplastic, solvent-soluble, co-condensation product. While the minimum amount of the modifying, thermosetting resin may approach zero, with consequent proportional reduction of the benefits of the invention, a minimum of about 10% by weight of the final co-condensation product is required to obtain what I would consider good ink properties in accordance with the invention, again depending upon the particular polyfunctional amide used for this purpose. When using melamine as the polyfunctional amide to form the thermosetting resin, this resin may suitably cinstitute from about 10% to 25% or so of the co-condensation product. Similar proportions are suitable when using dicyandiamide, but when using urea, in which one of but two functional amide groups is NH, this resin may suitably constitute from about 20% to 50% or so of the co-condensation product.

The invention is in no way limited by the process used to form the described class of thermoplastic vehicle resins. A suitable procedure is to form them by separately producing a partially condensed, aromatic monosulfonamide-formaldehyde condensation product as one component and a B-stage amide-formaldehyde condensation product as the other component, and then combining the two components and completing the condensation of both as a co-condensation product. This and other procedures are disclosed in the copending application, Serial No. 406,331, of Zenon Kazenas, filed January 26, 1954, now U.S. Patent No. 2,809,954, issued October 15, 1957. Any procedure may be used which will produce the final, desired, co-condensation product.

By high boiling solvents for the co-condensed vehicle resin, I mean any solvent for the particular resin of relatively low volatility, i.e. which has a vapor pressure less than 1 mm. of mercury at 20° C. Suitable solvents of this class are, e.g., butyl carbitol, butyl carbitol acetate, dimethyl phthalate, diethylene glycol, a mixture of dimethyl phthalate and diethylene glycol, and the like. Such high boiling solvents do not evaporate to an excessive degree on the press, yet will evaporate sufficiently fast when the ink is spread in thin films on paper or other printable surfaces. Though some degree of volatility is required, the minimum vapor pressure of the solvent may be as low as about 0.001 mm. of mercury at 20° C.

When a resin-solvent vehicle of the character described is ground with most resin-type pigments, it does not set quickly without the application of heat or other setting aid, but when a metallic resinate is substituted as the pigment resin, the vehicle, surprisingly, sets very rapidly.

The metallic resinate types of fluorescent pigments which are preferably used in the above described type of vehicle, to produce a fluorescent printing ink in accordance with the invention, are the metallic alkyd resin pigments. These are desirably produced in accordance with copending application Serial No. 302,989 of Thomas Norman Gaunt, filed August 6, 1952, now U.S. Patent No. 2,895,917, issued July 21, 1959, though other processes of preparing such metal resinates, as well as other types of metal resinates, may be used. In accordance with that application, an alkyd resin, such as an unmodified glycerol phthalate resin, is dissolved in an aqueous alkaline solution and heated preferably close to the boiling point of the solution. To this is added a hot solution of a fluorescent dye (which may contain a minor quantity of an organic solvent, such as monomethyl ether of ethylene glycol) or a pigment containing such a dye in a solvated condition. Preferably, while still hot, the resin and the dye or pigment in this mixture are coprecipitated with a water-soluble metal salt, such as aluminum sulfate, to form an aluminum alkyd resin containing the dye in a solvated condition. While any of the water-soluble salts of metals of groups II, III, and IV of the periodic table having molecular weights less than 140 may be used as the precipitant, the soluble salts of aluminum, beryllium, zirconium, and tin are suitable for either hot or cold precipitation, whereas the soluble salts of zinc, cadmium, barium, strontium, and magnesium are best used only for cold precipitation.

Suitable fluorescent dyes for use in a solvated condition in both the vehicle resin and the pigment resin to be added to the vehicle include, for example, basic dyes, e.g. Rhodamine B; acidic dyes, e.g. Brilliant Sulfoflavine FF; water-insoluble dyes capable of being finely dispersed in water, e.g. Duranol Brilliant Yellow 6G; and finely divided pigments such as dixanthylene or 2–2′ dihydroxy naphthaldazine. These and many others may be used alone or in various combinations; and conventional, non-fluorescent pigments and dyes may be incorporated in the vehicle in any desired manner to produce non-fluorescent colored inks.

An ideal printing ink vehicle for use on letter presses should have a combination of numerous properties which are difficult to obtain to a completely satisfactory degree. Among these properties, the following are particularly important:

(1.) Easy distribution uniformly over the surface of the ink rollers.
(2.) Resistance to drying and to hardening on the ink rollers.
(3.) A sufficiently high ratio of adhesiveness to cohesiveness to avoid stringing and flying from high speed ink rollers.
(4.) Good transfer properties from ink rollers to plates and from plates to paper and other surfaces to be printed.
(5.) No tendency to cause corrosion of metal plates.
(6.) Good adhesion to surfaces to be printed after the solvent has been eliminated.
(7.) Rapid setting when applied to surfaces in thin films.
(8.) Tolerance of high humidity atmospheres.
(9.) Good pigment wetting and binding qualities.
(10.) High pigment tolerance.
(11.) Good color stability, e.g. in resisting yellowing with age.
(12.) Long shelf-life.

Aromatic sulfonamide-formaldehyde resins have had many uses in the industrial arts, but have not heretofore made good letter press type printing ink vehicles in several of the respects enumerated above. However, I have discovered that, when these resins are substantially completely co-condensed with a thermosetting amide-formaldehyde resin and dissolved in a relatively high boiling solvent to form printing ink vehicles, the above enumerated properties are obtained to an extraordinarily high degree compared with vehicles heretofore considered to be of the highest quality. The general working qualities of the vehicles of the invention are outstanding, the vehicles are non-corrosive to metals used in printing plates, their pigment wetting and binding properties are excellent, with high pigment tolerance, and the color stability of the vehicles is comparable to the best commercial ink vehicles of the prior art. While the vehicles of the invention, without a suitable inhibitor, have a tendency to set-up or stiffen in the can on long storage, similarly to a thixotropic gel, such tendency may be reduced by adding to the ink composition from about 1% to 3% of a cationic emulsifying agent, such as triethanolamine. Not only do the vehicles of the invention adhere well to all kinds of paper, but they have remarkable adhesion to metal surfaces, such as the aluminum foils widely used in the packaging industry.

The inks may be formulated in either of three ways. First, the desired ink color may be obtained by incorporating a suitable dye into the vehicle resin, dissolving the dyed resin in the vehicle solvent, and grinding a colorless filler pigment into the vehicle to give the ink the desired body. Second, colored pigments may simply be ground into the colorless resin-solvent vehicle, with or without inert or colorless fillers. Third, the vehicle resin may be dyed as described, and colored pigments, with or without colorless fillers, may be ground into the dyed vehicle. Resin-solvent ratios of about 1:1 are generally satisfactory, though this ratio may be varied from about 9:11 to about 13:7, depending upon well understood formulation considerations. Such a vehicle may have conventional colored and/or colorless ink pigments ground therein in any amount from about 30% to 40% by weight of the total vehicle, depending upon well known considerations of working properties and color strength desired.

Special problems have long been encountered in making fluorescent printing inks which have not been solved satisfactorily heretofore because of peculiar characteristics of fluorescent dyes and pigments.

A characteristic of most fluorescent dyes, when incorporated in coating materials, is that they are sufficiently stable and actively fluorescent for most uses only when maintained in a solvated condition, within a relatively narrow range of concentrations and in a limited class of resinous vehicles. In general, the resinous vehicles suitable as carriers for fluorescent dyes are limited to the thermo-set resins, i.e. resins that are set by heat as distinguished from those that dry by oxidation. As a result, it has become customary to make a fluorescent pigment by dissolving the fluorescent dye in a thermosettable resin, setting the resin, and grinding the resin to a fine state of subdivision. The resulting pigment, i.e., finely divided, solid resin containing the dissolved dye, is incorporated into a suitable vehicle in the same manner as an ordinary pigment to produce a coating composition.

For some types of coating compositions such as paints and silk screen inks, for example, fluorescent pigments made in the foregoing manner, when ground into a so-called "air drying" vehicle (one that dries by oxidation), have functioned admirably to give satisfactory depth and brightness of color both by reflection and fluorescent emission. Though the tinctorial strengths and fluorescent brightness of these pigments have been such that relatively high pigment concentrations were necessary, this created no great technical problem in the paint and silk screen arts. However, it has been a serious problem in the printing ink art, where such high pigment concentrations make it difficult to apply the thin films essential to most printing operations, thus producing inks which are unmanageable in such operations. Because there seems to be a definite limit on the fluorescent brightness that can be achieved by the use of greater dye concentrations in the pigment resins, increasing such dye concentrations is no solution to this problem.

Efforts have been made with indifferent success to dissolve additional fluorescent dye in the air drying ink vehicle. In some vehicles, the dyes added in this manner simply would not dissolve; in others, the dyes were not actively fluorescent; and in still others, the dyes were initially quite active, but were too unstable for practical use. Though some slight improvement has been obtained in this manner, these efforts have far from solved the problem of obtaining satisfactory fluorescent brightness and stability in printing inks.

By dissolving a fluorescent dye in a vehicle resin of the co-condensation product type described above, then dissolving the dyed vehicle resin in a high boiling solvent, and incorporating additional fluorescent dye into this vehicle in the form of a metallic resinate pigment, such as the metallic alkyd resin type pigments described above, and in the usual concentration with respect to the amount of vehicle, a printing ink may be produced having excellent fluorescent stability and working properties, and also having greatly increased fluorescent brightness and tinctorial strength. In fact, the resultant fluorescent brightness is greater than the sum of the brightness of the pigment alone in the same vehicle and of the dissolved dye alone in the vehicle.

In accordance with the invention, a fluorescent dye, such as a Rhodamine, a naphthalimide, or a coumarin, or the like, or a mixture of such dyes, may be added to a suitable thermoplastic solvent-soluble vehicle resin in the course of its manufacture or by dissolving the resin and dye or dyes in a mutual solvent and evaporating the solvent. Alternatively, if the vehicle resin can be melted, the dye or dyes may be added to the liquid resin melt.

A preferred vehicle resin for producing fluorescent inks in accordance with the invention is a thermoplastic material comprising the co-condensation product of (a) a thermoplastic, aromatic, sulfonamide-formaldehyde condensation product and (b) a B-stage partially condensed resin formed by reaction of formaldehyde with a compound selected from the group consisting of melamine and derivatives thereof. The amount of the B-stage partially condensed resin in such co-condensation product should not exceed about 35% by weight of the final product (about 50% by weight of the aromatic sulfonamide-formaldehyde component) and is preferably about 16% to 19% by weight of the final product. Resins of this type and the method of making them are disclosed and claimed in the above mentioned copending application, Serial No. 406,331, of Zenon Kazenas.

Resins of the last described character, though thermoplastic, are brittle and friable below their softening points and do not exhibit the property of cold flow at room temperatures as do the simple sulfonamide-aldehyde resins. They also have higher melting points than the simple sulfonamide-aldehyde resins. They may be highly colored with fluorescent and/or non-fluorescent dyes in a light-fast condition; they are soluble in a number of solvents; and they release solvents more rapidly than the simple sulfonamide-aldehyde resins. By reason of these characteristics, the preferred class of resins described is particularly suitable for use in fluorescent inks.

The solvent for the vehicle resin should be one in which the pigment resin is insoluble. When using the preferred type of vehicle resin and an aluminum alkyd resin pigment for producing fluorescent inks, the preferred vehicle solvent is butyl Carbitol acetate, though others may be used.

The foregoing disclosure of the invention sets forth the general character thereof and indicates the many variations of ink vehicles and finished printing inks that are within its scope. Without in any way limiting the scope of the invention, the following examples of specific vehicle and ink formulations are given for illustrative purposes:

Vehicle No. 1

A colorless vehicle resin may be prepared by melting 360 parts of mixed o- and p-toluene sulfonamide-formaldehyde resins at a temperature in the range of 60°–70° C. and then raising the temperature of the melt to about 125° C.; dissolving in the melt at this temperature 78.4 parts of B-stage unmodified melamine-formaldehyde resin; continuing to heat the resulting solution to about 170° C. and holding it at that temperature for about 10 minutes to form the desired co-condensation product. On cooling, this resin product solidifies at about 115° C. The resin is ground and dissolved in an equal amount by weight of butyl Carbitol acetate with heating to about 130° to 150° C. The resulting vehicle is suitable for receiving any of the usual colored printing ink pigments, either fluorescent or non-fluorescent, to produce a letter press ink.

Vehicle No. 2

A vehicle having a fluorescent dye dissolved in the vehicle resin is prepared in the same manner as Vehicle No. 1, except that, while the resin co-condensation product is still at the temperature of about 170° C. at which the co-condensation is completed, 6% by weight of Brilliant Yellow 6G base (4 amino 1,8 naphthal 2',4' dimethyl phenylimide) and 0.44% by weight of Rhodamine 6GDN Extra (Color Index No. 752), based on the weight of the resin, are dissolved therein. The solution resulting from dissolving the dyed vehicle resin in the solvent is a yellow-orange daylight fluorescent vehicle and is suitable for use with added daylight fluorescent, dyed, metal resinate pigments to increase the color depth and fluorescent brightness of an ink composition and give it the desired final color.

Vehicle No. 3

The color of Vehicle No. 1 may be made an orange-red daylight fluorescent color by substituting for the dyes of Vehicle No. 2 a combination of 1% of the same Brilliant Yellow 6G base, 0.83% of the same Rhodamine 6 GDN Extra, and 0.6% of Rhodamine B Extra, together with 0.016% of 70% phosphorous acid (all based on the weight of the resin).

Vehicle No. 4

A colorless vehicle may be simply prepared, using urea as the polyfunctional amide, by mixing 17 parts of molten, mixed o- and p-toluene sulfonamide-formaldehyde resin at 120° C. with 13 parts of paraformaldehyde and 10 parts of urea, and heating the mixture to a temperature of 150° to 160° C. to form the desired co-condensation product. When this product has cooled to a hard, brittle resin, it may be ground and dissolved in about 27 parts of Carbitol with heating at about 100° C. until a clear solution is formed. This vehicle is suitable for receiving any of the usual colored, printing ink pigments, either fluorescent or non-fluorescent, to produce a letter press ink.

Vehicle No. 5

The same Vehicle No. 4 may be dyed by adding to 20 parts of the finished Vehicle No. 4, while still at 100° C., 0.18 part of Fluorol 7GA, 0.06 part of Rhodamine 6 GDN Extra, and 0.045 part of Rhodamine B Extra. The resulting vehicle is daylight fluorescent with a red-orange emission and is particularly suitable for incorporation of daylight fluorescent metal resinate pigments to enhance and, if desired, to modify the final ink color.

Vehicle No. 6

Another vehicle using a considerably smaller amount of urea as the polyfunctional amide may be prepared in the same manner as Vehicle No. 4 using 45 parts of the same toluene sulfonamide-formaldehyde resin, 5 parts of paraformaldehyde, and 5 parts of urea. When dissolved in butyl Carbitol in the ratio of 12:8 and at about 100° C., a colorless ink vehicle of general utility for letter press inks results. To produce a bluish-red or cerise-dyed daylight fluorescent vehicle particularly suitable for incorporation of additional daylight fluorescent pigment, 0.2325 part each of Rhodamine B Extra and Rhodamine 6 GDN Extra were added to 46.5 parts of the resin while dissolved in the butyl Carbitol solvent at about 100° C.

Vehicle No. 7

Using the same simplified procedure as for Vehicle No. 4, 180 parts of the same toluene sulfonamide-formaldehyde resin were melted, 20 parts each of melamine and paraformaldehyde were added at 130° C., and the temperature was raised to 165° C. and held until clear. The cooled, solidified resin was ground and dissolved at about 100° C. in butyl Carbitol, in the ratio of about 13:7, and 1.3 parts of Flurol 7 GA were added to the solution at that temperature to produce a chartreuse-dyed daylight fluorescent vehicle.

Essentially the same vehicle properties result when the butyl Carbitol of this vehicle is replaced by an equal quantity of methyl Carbitol acetate, or butyl Carbitol acetate, or Carbitol acetate, or Carbitol, or 1,3 butylene glycol, or other low boiling solvents or mixtures thereof, as will be understood to be generally true for the other solvents referred to in the various examples herein.

*Vehicle No. 8*

A colorless vehicle may be prepared using dicyandiamide as the polyfunctional amide by mixing into 180 parts of the same toluene sulfonamide resin, at 120° C., 20 parts of dicyandiamide and 14.3 parts of paraformaldehyde, heating to 175° C. and holding until clear. The cooled and ground resin may be dissolved in an equal amount of butyl Carbitol at about 100° C. to produce a clear vehicle suitable for receiving any of the usual, colored, printing ink pigments, either fluorescent or non-fluorescent, to produce a letter press ink.

*Vehicle No. 9*

An outstanding dyed vehicle for a daylight fluorescent ink may be prepared by heating 336 parts of a mixture of o- and p-toluene sulfonamide to about 115° C., adding 68.2 parts of paraformaldehyde and 1.4 parts of hexamethylene tetramine and agitating until clear. The temperature is then raised to 125° C., and 65.3 parts of a B-stage melamine-formaldehyde resin are added while mixing and heating to 176° C. and holding at that temperature until clear. While the resulting co-condensation product is still in a molten condition, 4.15 parts of Brilliant Yellow 6G base, 3.44 parts of Rhodamine 6 GDN, and 2.49 parts of Rhodamine B Extra are dissolved therein. The cooled and ground, dyed resin is then dissolved in dimethyl phthalate at about 100° C., in the ratio of 43 parts of dyed resin to 57 parts of this solvent, to produce a red-orange daylight fluorescent vehicle particularly suited for incorporation of metal resinate type daylight fluorescent pigments to enhance and, if desired, modify the color and fluorescent brightness of a letter press ink.

The amount of the dye or dyes incorporated in the vehicle resin may be varied widely according to the particular dye or dyes employed to achieve the desired final color when a particular pigment is combined therewith in the final ink composition, as well as to increase the total fluorescent brightness in accordance with the invention. In general, for example, a maximum of about 3% by weight is preferred in the case of red dyes and about 7% in the case of yellow dyes.

Final ink compositions in accordance with the invention may be prepared by adding an appropriate quantity of triethanolamine to the cooled vehicle, if desired to inhibit setting up in the can, and then grinding one or more pigments into the vehicle. The possible variations as to kind and amount of pigment are, of course, too numerous for more than a relatively few representative examples to be given herein. The following will sufficiently illustrate the invention in this respect:

*Ink No. 1*

Vehicle No. 1 may be pigmented with 5% of a phthalocyanine blue or green pigment and 30% of aluminum hydrate to produce a letter press ink of a plain, bright blue or green color with excellent working properties.

*Ink No. 2*

Vehicle No. 1 may be pigmented with 35% of a red daylight fluorescent pigment prepared by mixing 80 grams of glyceryl phthalate and 646 cc. of water, then adding 15 grams of ammonium hydroxide in 108 cc. of water and heating to about 97° C. At this temperature there is added a separately prepared mixture of—

| | |
|---|---|
| Rhodamine B Extra _____grams__ | 1.08 |
| Rhodamine 6 GDN Extra _____do____ | 1.32 |
| Methyl Cellosolve _____cc__ | 30 |
| Ekaline F (a registered trademark for a non-ionic dispersing agent stable at 100° C.) _____grams__ | 0.8 |
| Water _____cc__ | 215 |

The mixture resulting from the last addition is heated to about 97° to 100° C. and a solution of 25.6 grams of aluminum sulfate [$Al_2(SO_4)_3 \cdot 18H_2O$] in 256 cc. of water, heated to a boil, is quickly added to precipitate the pigment.

When 35% of the above pigment is ground into Vehicle No. 1, a brilliantly daylight fluorescent cerise-red letter press ink of excellent working properties results.

*Ink No. 3*

When 17.5 parts by weight of the cerise-red, daylight fluorescent pigment of Ink No. 2 is ground into 30 parts by weight of the yellow-orange daylight fluorescent Vehicle No. 2, a brilliantly daylight fluorescent, orange printing ink with exceptional color depth and general working properties results.

*Ink No. 4*

When the same amount of the orange-red dyed Vehicle No. 3 is substituted for the cerise-red daylight fluorescent Vehicle No. 2 used in Ink No. 3, while using the same amount of the same cerise red pigment, a brilliantly daylight fluorescent, rose-red printing ink with equally fine color depth and working properties results.

*Ink No. 5*

To 40 parts of the red-orange-dyed Vehicle No. 5 are added 10 parts of the bright orange daylight fluorescent pigment of Example 3 in U.S. Patent No. 2,498,592 of Joseph L. Switzer et al. and 5 parts of lithopone to produce a brilliantly daylight fluorescent red-orange letter press ink.

*Ink No. 6*

To 67 parts of the cerise-dyed Vehicle No. 6 are added 9.8 parts of lithopone and 22.1 parts of the bright red daylight fluorescent pigment of Example 5 of the above mentioned U.S. Patent No. 2,498,592 to produce a brilliantly daylight fluorescent red letter press ink.

*Ink No. 7*

By substituting for the chartreuse dye of Vehicle No. 7 a combination of 0.1 part Brilliant Yellow 6G base, 0.05 part Rhodamine 6 GDN Extra, and 0.0375 part of Rhodamine B Extra and combining these with a 12:8 ratio of the vehicle resin and solvent, a red-orange-dyed vehicle results. By incorporating 5 parts of the orange daylight fluorescent pigment of Ink No. 5 into this vehicle, a brilliantly daylight fluorescent reddish orange letter press ink is produced.

*Ink No. 8*

By incorporating 1.6 parts of triethanolamine and 35 parts of the red pigment of Ink No. 2 into 65 parts of Vehicle No. 9, a brilliantly daylight fluorescent scarlet letter press ink is produced.

In the foregoing examples of vehicles and inks, where not specifically stated, all parts and proportions are given in terms of quantities by weight.

In view of the foregoing description of the invention and examples of vehicle and ink compositions prepared in accordance therewith, it will be appreciated that the specific component materials referred to and various equivalents thereof may be combined in many different combinations and permutations in accordance with the principles of the invention taught herein. Accordingly, the invention is intended to embrace such variations thereof as will occur to those skilled in the art, within the scope of the appended claims.

What I claim is:

1. A printing ink consisting essentially of a solvent-soluble, thermoplastic, vehicle binder consisting essentially of a thermoplastic, aromatic monosulfonamide-formaldehyde resin substantially completely co-condensed with a thermosetting resin condensation product of formaldehyde and an amide having at least two functional amide groups of which at least one is $NH_2$, said resins being co-condensed in a ratio between about 9:1 and 1:1, an organic solvent for said binder having a vapor pressure less than 1 mm. of mercury at 20° C., and an insoluble organic fluorescent pigment suspended in the solution of binder and solvent.

2. A printing ink consisting essentially of a solvent-soluble, thermoplastic, vehicle binder consisting essentially of a thermoplastic, aromatic monosulfonamide-formaldehyde resin substantially completely co-condensed with a thermosetting resin condensation product of formaldehyde and an amide having at least two functional amide groups of which at least one is $NH_2$, said resins being co-condensed in a ratio between about 9:1 and 1:1, an organic solvent for said binder having a vapor pressure less than 1 mm. of mercury at 20° C., a small amount of a cationic emulsifying agent to inhibit gelation of the binder, and an insoluble organic fluorescent pigment suspended in the solution of binder and solvent.

3. A printing ink consisting essentially of a solvent-soluble, thermoplastic, vehicle binder consisting essentially of a thermoplastic, aromatic monosulfonamide-formaldehyde resin substantially completely co-condensed with a thermosetting resin condensation product of formaldehyde and an amide having at least two functional amide groups of which at least one is $NH_2$, said resins being co-condensed in a ratio in the range between about 9:1 and 1:1, a fluorescent dye dispersed in said co-condensation product in a solvated condition, an organic solvent for said binder having a vapor pressure less than 1 mm. of mercury at 20 C., and an insoluble organic fluorescent pigment suspended in the solution of binder and solvent.

4. A printing ink consisting essentially of a solvent-soluble, thermoplastic, vehicle binder consisting essentially of a thermoplastic, aromatic monosulfonamide-formaldehyde resin substantially completely co-condensed with a thermosetting resin condensation product of formaldehyde and an amide having at least two functional amide groups of which at least one is $NH_2$, said resins being co-condensed in a ratio in the range between about 9:1 and 1:1, a fluorescent dye dispersed in said co-condensation product in a solvated condition, an organic solvent for said binder having a vapor pressure less than 1 mm. of mercury at 20° C., and a fluorescent pigment suspended in the solution of binder and solvent, said pigment being a finely divided insoluble metal resinate having additional fluorescent dye dispersed therein in a solvated condition.

5. A printing ink consisting essentially of a solvent-soluble, thermoplastic, vehicle binder consisting essentially of a thermoplastic, aromatic monosulfonamide-formaldehyde resin substantially completely co-condensed with a thermosetting resin condensation product of formaldehyde and an amide having at least two functional amide groups of which at least one is $NH_2$, said resins being co-condensed in a ratio in the range between about 9:1 and 1:1, a fluorescent dye dispersed in said co-condensation product in a solvated condition, an organic solvent for said binder having a vapor pressure less than 1 mm. of mercury at 20° C., and a fluorescent pigment suspended in the solution of binder and solvent, said pigment being a finely divided insoluble metal alkyd resin having additional fluorescent dye dispersed therein in a solvated condition.

6. A printing ink consisting essentially of a solvent-soluble, thermoplastic, vehicle binder consisting essentially of a thermoplastic, aromatic monosulfonamide-formaldehyde resin substantially completely co-condensed with a thermosetting resin condensation product of formaldehyde and an amide having at least two functional amide groups of which at least one is $NH_2$, said resins being co-condensed in a ratio between about 9:1 and 1:1, an organic solvent for said binder having a vapor pressure less than 1 mm. of mercury at 20° C., and a fluorescent pigment suspended in the solution of binder and solvent, said pigment being a finely divided insoluble metal resinate having a fluorescent dye dispersed therein in a solvated condition.

7. A printing ink consisting essentially of a solvent-soluble, thermoplastic, vehicle binder consisting essentially of a thermoplastic, aromatic monosulfonamide-formaldehyde resin substantially completely co-condensed with a melamine-formaldehyde resin in a ratio in the range between about 9:1 and 3:1, a fluorescent dye dispersed in said co-condensation product in a solvated condition, an organic solvent for said binder having a vapor pressure less than 1 mm. of mercury at 20° C., and a fluorescent pigment suspended in the solution of binder and solvent, said pigment being a finely divided insoluble metal alkyd resin having additional fluorescent dye dispersed therein in a solvated condition.

8. A printing ink consisting essentially of a solvent-soluble, thermoplastic, vehicle binder consisting essentially of a thermoplastic, aromatic monosulfonamide-formaldehyde resin substantially completely co-condensed with a urea-formaldehyde resin in a ratio in the range between about 5:1 and 1:1, a fluorescent dye dispersed in said co-condensation product in a solvated condition, an organic solvent for said binder having a vapor pressure less than 1 mm. of mercury at 20° C., and a fluorescent pigment suspended in the solution of binder and solvent, said pigment being a finely divided insoluble metal alkyd resin having additional fluorescent dye dispersed therein in a solvated condition.

9. A printing ink consisting essentially of a solvent-soluble, thermoplastic, vehicle binder consisting essentially of a thermoplastic, aromatic monosulfonamide-formaldehyde resin substantially completely co-condensed with a dicyandiamide-formaldehyde resin in a ratio in the range between about 9:1 and 3:1, a fluorescent dye dispersed in said co-condensation product in a solvated condition, an organic solvent for said binder having a vapor pressure less than 1 mm. of mercury at 20° C., and a fluorescent pigment suspended in the solution of binder and solvent, said pigment being a finely divided insoluble metal alkyd resin having additional fluorescent dye dispersed therein in a solvated condition.

References Cited in the file of this patent

UNITED STATES PATENTS

| | | |
|---|---|---|
| 2,267,758 | Sell | Dec. 30, 1941 |
| 2,498,592 | Switzer | Feb. 21, 1950 |
| 2,536,049 | Flanagan | Jan. 2, 1951 |
| 2,545,716 | Thompson | Mar. 20, 1951 |
| 2,567,979 | Taylor | Sept. 19, 1951 |
| 2,734,871 | McCafferty | Feb. 14, 1956 |
| 2,809,954 | Kazenas | Oct. 15, 1957 |

FOREIGN PATENTS

| | | |
|---|---|---|
| 161,688 | Australia | May 21, 1953 |
| 733,856 | Great Britain | July 20, 1955 |